W. Ashton.

Screw Die.

N° 67,396.   Patented Aug. 6, 1867.

Witnesses
Isaac Zipp
Desire Greenmore

Inventor,
Walter Ashton

United States Patent Office.

WALTER ASHTON, OF UTICA, NEW YORK, ASSIGNOR TO HIMSELF AND EDWARD K. QUINN, OF SAME PLACE.

*Letters Patent No. 67,396, dated August 6, 1867.*

---

IMPROVEMENT IN SCREW-PLATES.

---

*The Schedule referred to in these Letters Patent and making part of the same.*

---

TO ALL WHOM IT MAY CONCERN:

Be it known that I, WALTER ASHTON, of Utica, Oneida county, New York, have invented a new and useful Improvement in Screw-Plates; and I do hereby declare that the following is a full, clear, and exact description of said invention, and of the mode of operation of the same, reference being had to the annexed drawings, making a part of this specification, in which—

A is the screw-plate; $A^1$ and $A^2$ are the handles thereof; $A^3$, $A^4$, and $A^5$, are dove-tails for holding the plate F; B is a die; B', the recess in which it is placed; C is a chaser; D and E are gibs; D' and E' are regulating screws; F is a plate or cover of the die and chaser; G is a set-screw; H is the opening through which the bolt is passed.

Figure 1:
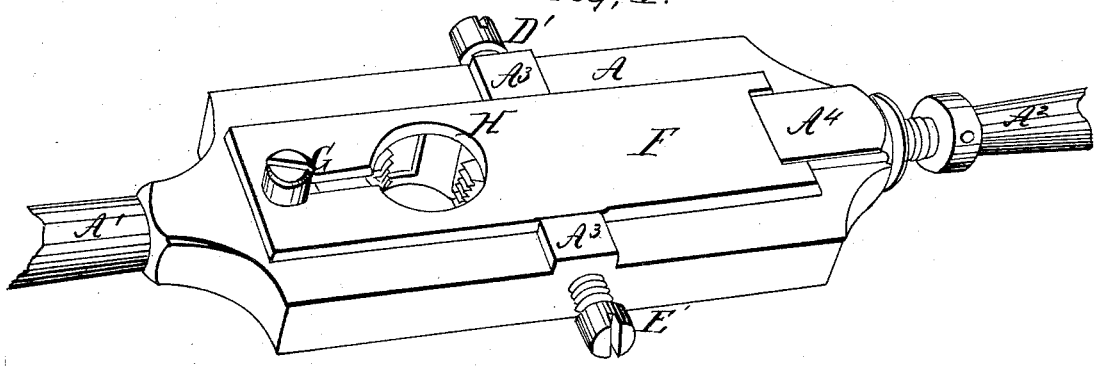
Figure 1 is a perspective view of the improved screw-plate.
Figure 2:
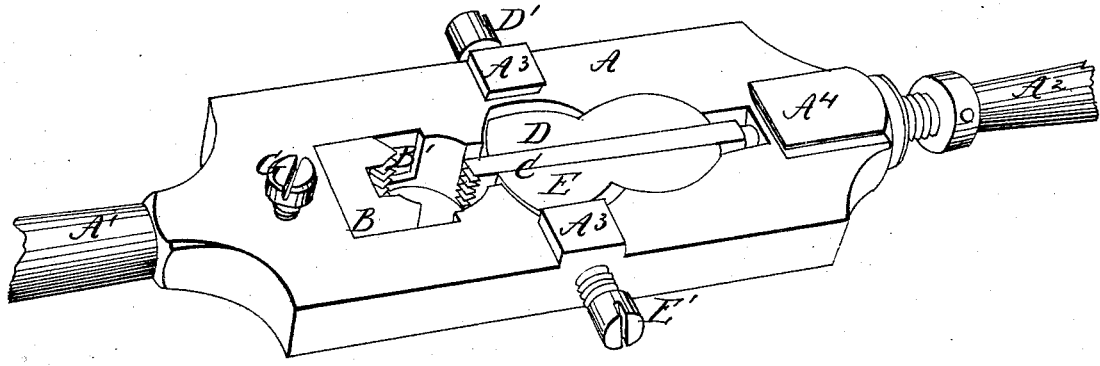
Figure 2 is a like view, with the cover removed.

The form of the screw-plate is not material, and it may be of cast or wrought metal. One handle, $A^1$, may be cast or forged with the plate, but the other must be separate, and connected with the plate by a screw, as represented in the drawing, which screw serves as well to attach it to the plate as to press up and hold the chaser to the work. There need be an opening through the plate only sufficient to pass the bolt. But the upper surface of the plate must be recessed to receive the die and chaser, as well as the gibs; all which, when in place, should have their upper surfaces even with the upper surface of the plate, as seen in fig. 2. The die B may be of the usual form, or of any other suitable form, and is set in the recess B'. Opposite the die B is the chaser C, which may have the form of a narrow bar, placed on its edge, with the cutting end towards B, and the other extending to the screw on the end of the handle $A^2$. At each side of the chaser is a gib, D and E, to hold the chaser in place. These gibs are of the form as seen in fig. 2, having each the rear side of the form of a segment of a circle, and the recesses in the plate in which they are placed having similar forms. This allows them to be turned to the right or left, and with them the chaser, by means of the screws D' and E', so as to cut a right or left-hand screw. The cover F slides into dove-tails $A^3$ $A^4$ and $A^5$, and by means of the slot from this opening H, under the head of the screw G. The opening H in the plate F corresponds with the opening through the plate.

The mode of operation is as follows: The die B and chaser C are put in place, and the plate F slipped into the dove-tails, and secured by the screw G, and the distance of the chaser is regulated by the screw on the end of the handle $A^2$. The instrument may now be used in the ordinary manner. When the chaser is centrally in front of the die B, the operation is about the same as the ordinary plate. But if the chaser is turned to the right by the screw E', the chaser presents, not its whole front to the work, but its near edge, and consequently it cuts the thread on the bolt, instead of squeezing it or pressing it out, and hence such screw may be cut down to any desired size, however large the bolt may be; whereas with the ordinary dies, this can only be done by pressing by force the dies into the metal, or by cutting off the thread. Thus a better and a neater thread is formed, and with less power and wear. When a left-hand screw is to be cut, the chaser is turned to the left by turning the set-screw D'. The chaser may be placed in the proper position, and held there permanently without the aid of the gibs and regulating screws. But the arrangement described is preferable, as it enables the workman to regulate the cut on the screw with great facility.

The advantages of a plate so constructed are, it is easily made and readily applied, and not liable to get out of order. But its main advantage is that by permitting the chaser to be moved as mentioned, a cutting edge of less or greater depth may always be presented to the bolt, and the thread be cut to the desired size.

I claim, in a screw-plate, the chaser C, gibs D and E, and set-screws D' and E', or their equivalents, in combination, constructed and operating substantially as described and for the uses and purposes mentioned.

WALTER ASHTON.

Witnesses:
 ISAAC TRIPP, Jr.,
 DEXTER GILLMORE.